US007021831B2

(12) United States Patent
Chadwick et al.

(10) Patent No.: US 7,021,831 B2
(45) Date of Patent: Apr. 4, 2006

(54) ZERO RADIAL AND AXIAL CLEARANCE BEARING ASSEMBLY

(75) Inventors: Edwin R. Chadwick, Goshen, CT (US); Mitchell Bussell, New Hartford, CT (US); Robert A. Hoyt, Bristol, CT (US); Russel H. Marvin, Goshen, CT (US); Gary Peresada, Torrington, CT (US)

(73) Assignee: Torrington Research Co., Torrington, CT (US)

( * ) Notice: Subject to any disclaimer, the term of this patent is extended or adjusted under 35 U.S.C. 154(b) by 92 days.

(21) Appl. No.: 10/874,924

(22) Filed: Jun. 23, 2004

(65) Prior Publication Data

US 2005/0074193 A1 Apr. 7, 2005

Related U.S. Application Data

(60) Provisional application No. 60/508,411, filed on Oct. 2, 2003.

(51) Int. Cl.
*F16C 19/08* (2006.01)

(52) U.S. Cl. ...................................... 384/517; 384/535

(58) Field of Classification Search ................ 384/517, 384/518, 535, 536, 537
See application file for complete search history.

(56) References Cited

U.S. PATENT DOCUMENTS

| | | | | |
|---|---|---|---|---|
| 6,179,473 | B1 * | 1/2001 | Ponson et al. | 384/537 |
| 6,394,658 | B1 * | 5/2002 | Crowell | 384/537 |

* cited by examiner

*Primary Examiner*—Lenard A. Footland
(74) *Attorney, Agent, or Firm*—Theodore Paulding

(57) ABSTRACT

A zero clearance bearing assembly comprising a housing defining a generally cylindrical bearing chamber with a pair of ball bearing units disposed therein. One unit is adjacent an axial thrust reaction surface of frusto-conical configuration and a shoulder on an associated shaft urges the unit into engagement with the surface. The other unit is press fit on the shaft and also has a shaft shoulder urging it toward the thrust surface. An air impeller on the shaft urges the same toward the other bearing unit and the thrust unit reacts to both the impeller load and an axial preload spring engaging the other bearing unit. One or both of the bearing units is provided with an improved radial preload device comprising a spring and a pair of circumaxially spaced reaction surfaces opposing the same.

15 Claims, 2 Drawing Sheets

ZERO RADIAL AND AXIAL CLEARANCE BEARING ASSEMBLY

RELATED APPLICATION

Provisional application No. 60/508,411, titled "Zero radial and axial clearance bearing system" filed Oct. 2, 2003, inventors Edwin R. Chadwick, Mitchell Bussell, Robert A. Hoyt, Russel H. Marvin, Gary Peresada, incorporated herein by reference.

BACKGROUND OF THE INVENTION

The present invention relates to a bearing assembly which can accommodate relatively large tolerances and also compensate for greater thermal expansion differences between discrete materials than are usually encountered. Currently available bearing assemblies are generally but not wholly satisfactory.

It is the general object of the invention to provide a bearing assembly which is of desirably simple construction but which can readily accommodate relatively large tolerances and thermal expansion differences.

SUMMARY OF THE INVENTION

In accordance with the present invention and in fulfillment of the aforementioned object, a bearing assembly comprises a housing which defines a generally cylindrical bearing chamber which is open axially at least at one end. Spaced apart axially aligned first and second bearing means are provided with at least one conventional ball bearing unit disposed in the bearing chamber and comprising an annular series of ball bearings and associated inner and outer bearing rings. Adjacent to and engaged by one of the bearing means is an axial thrust reaction surface which may vary in form but which preferably takes a frusto-conical configuration with its larger end facing the bearing means. A shaft journalled in the first and second bearing means projects through the open end of the bearing chamber and may carry a load having an axial component in a direction opposing the thrust reaction surface. The bearing means may be press fit on the shaft or an annular shoulder may be provided on the shaft to secure the bearing means against movement in a direction away from the thrust surface and thus insure firm engagement of the bearing means with the thrust surface. An axial preload means, preferably in the form of a spring engaging the other bearing means, also urges the bearing means into engagement with the thrust reaction surface.

Radial preload means, preferably in the form of a spring engaging the bearing means radially is also provided for at least one and preferably both bearing means, with a pair of circumaxially spaced radial reaction surfaces associated with each spring and bearing means and opposing the preload spring.

The frusto-conical surface has the dual purpose of reacting axial loads and centering the adjacent bearing means and shaft. Additionally, at least three axially elongated centering ribs are provided and spaced circumaxially so as to be engaged and crushed by the bearing means to center the latter.

In accordance with the presently preferred practice, both of the first and second bearing means take the form of conventional ball bearing units and both are disposed in the bearing chamber in axially spaced relationship either in press fit engagement with the shaft or with annular shoulders on the shaft on a side of the units opposite the axial thrust means. Further, both bearing units are provided with radial preload means in the manner aforesaid.

It should also be noted that the bearing chamber may be cylindrical or slightly tapered with the smaller end adjacent the axial thrust reaction surface.

Finally, the invention finds a most appropriate use in a molded plastic bearing assembly, that is, an assembly where the bearing units are of conventional metallic construction and the housing of molded plastic construction with the above-mentioned tolerance and disparate thermal expansion characteristics in evidence. Further, the invention finds particularly advantageous use in a molded plastic construction combining an electric motor-bearing housing with a molded plastic or other fluid impeller driven by the motor.

DESCRIPTION OF PREFERRED EMBODIMENTS

Figure 1:
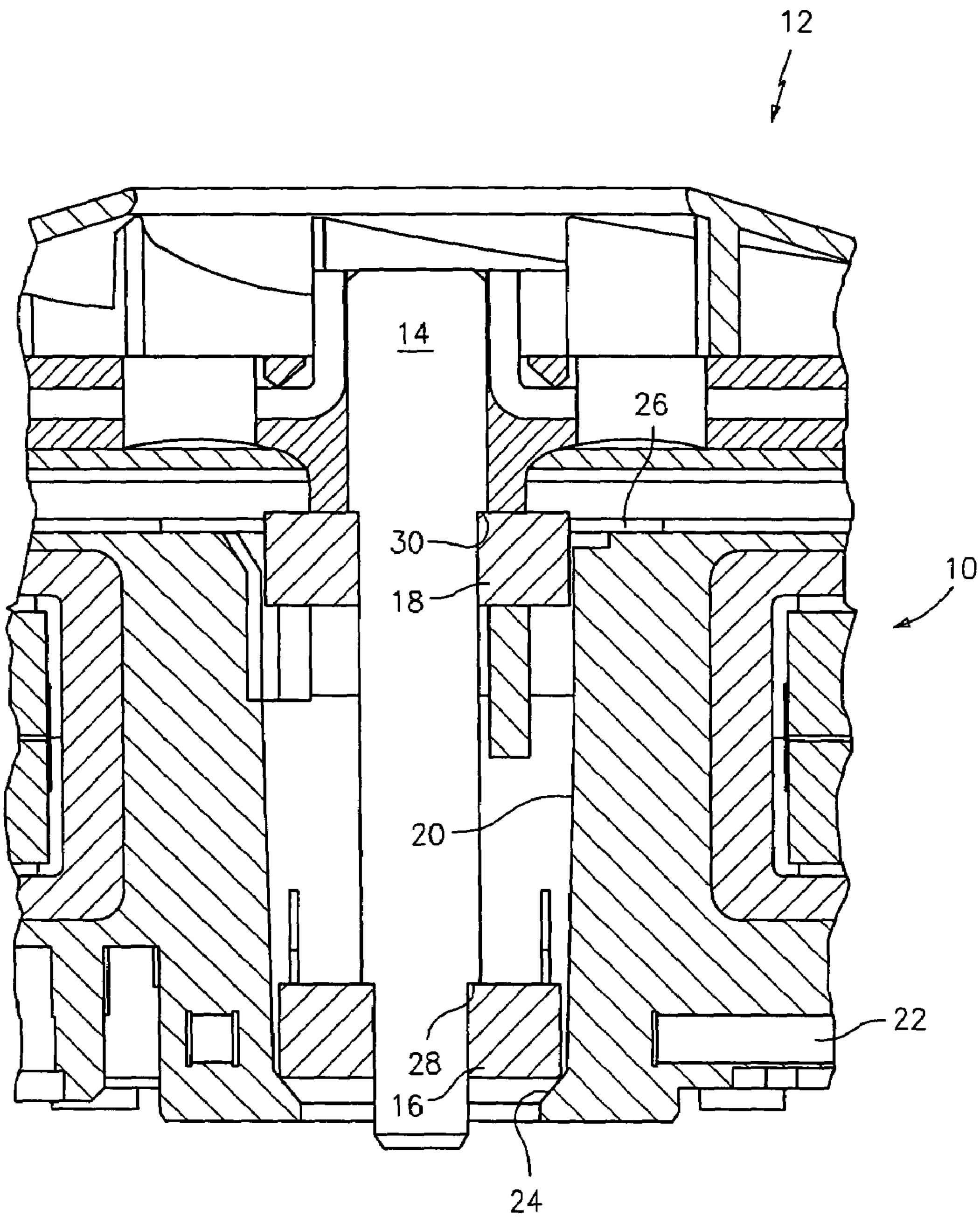
FIG. 1 cross sectional view of a bearing assembly constructed in accordance with the present invention.
Figure 2:
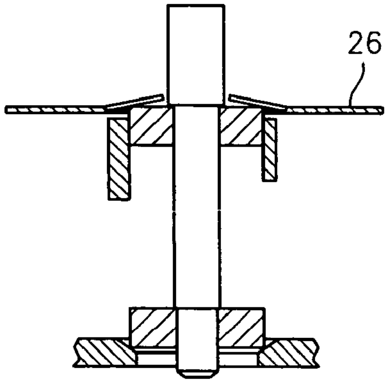
FIG. 2 is a schematic sectional view similar to FIG. 1 but better illustrating certain elements of the assembly.
Figure 3:
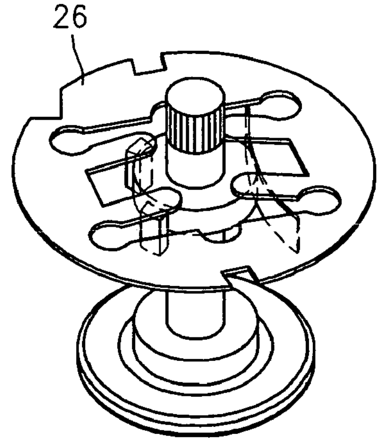
FIG. 3 is a schematic perspective view of the FIGS. 1 and 2 assembly better illustrating axial and radial preload springs in particular.

Referring initially to FIGS. 1, 2 and 3 it will be observed that a bearing assembly indicated generally at 10 has an associated air impeller 12 which is mounted on and rotatably driven by a shaft 14 journalled in axially aligned first and second bearing means 16 and 18. As will be apparent, the bearing assembly 10 forms a part of an electric motor, partially shown.

In accordance with the invention, at least one of the bearing means is a conventional ball bearing unit comprising an annular series of ball bearings and associated inner and outer bearing rings. Further, at least one and preferably both bearing mean are conventional ball bearing units and both are disposed in a bearing chamber 20 defined in a bearing housing 22. The housing 22 shown is of molded plastic construction and has the aforementioned characteristics which benefit from the zero clearance feature of the bearing assembly. It should be understood, however, that the use of the present invention is not so limited.

The lower bearing unit 16 in FIGS. 1–3 engages an axial thrust reaction surface 24 immediately there beneath and, as shown and presently preferred, the thrust surface takes a frusto-conical configuration. Thus, the surface 24 serves not only to react axial thrust forces but also transmits a radial component of reactive force to provide a centering function with respect to the bearing 16 and the shaft 14. An axial preload means is also provided in accordance with the invention and takes the form of a spring 26 mounted in the housing 22 and serving to urge the upper bearing unit 18 downwardly in FIGS. 1–3. The bearing units 16 and 18 may be in press-fit engagement with the shaft 14 whereby to transmit the axial downward force of the spring 26 to the thrust reaction surface 24 via the bearings and the shaft 14.

Similarly, in FIG. 1 the impeller 12 exerts a downward force or load on the shaft 14 which is reacted by the thrust surface 24. In addition to or in place of the press fit engagement of the bearings on the shaft 14, annular shoulders 28 and 30 may be provided on the shaft 14 respectively engaging the bearings 16 and 18 and urging them downwardly for reaction by the thrust surface 24 to the preload spring 26 and the impeller 14.

Preferably, the bearing chamber 20 has a slight taper with the smaller end disposed downwardly in FIGS. 1–3. Thus, the bearing unit may be slightly smaller than the unit 18.

Alternatively, the chamber 20 may be cylindrical with bearing units of the same size or with the unit 16 having an inner ring slight smaller than the inner ring of the unit 18.

Figure 4:
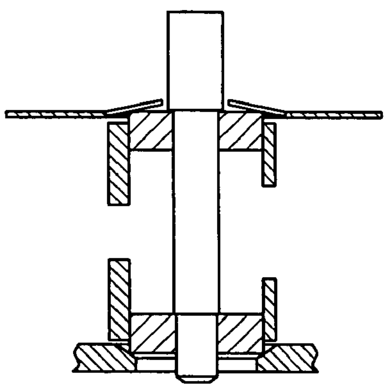
FIG. 4 is a schematic sectional view similar to FIG. 2 but showing a second embodiment of the invention wherein both bearings are radially preloaded.
Figure 5:
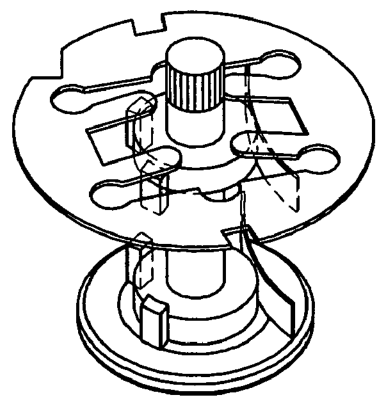
FIG. 5 is a schematic perspective view of the FIG. 4 embodiment of the invention.
Figure 6:
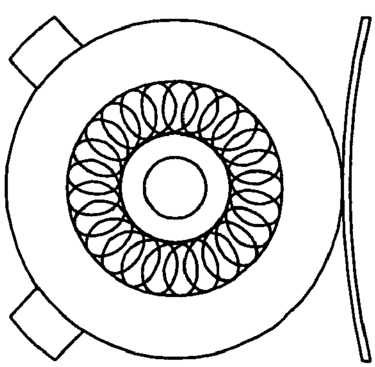
FIG. 6 is a top view of a radial preload spring and associated reaction abutments.

Finally, radial preloading of the bearing units is provided for in a much-improved manner, relative to the conventional corrugated sleeve arrangement. In FIGS. 1–3, only the upper bearing unit 18 is provided with radial preload means but in FIGS. 4 and 5 both upper and lower units 16 and 18 are provided with radial preload means which may be substantially identical. In each instance, a radial preload spring 32 is provided radially adjacent the bearing unit and a triangular force system is provided for with a pair of circumaxially spaced radial reaction surfaces 34,34 generally opposite the spring, FIG. 6. Excellent results in radial preloading are thus achieved despite the gross tolerances and disparate thermal expansion rates sometimes encountered as in molded plastic construction.

Figure 7:
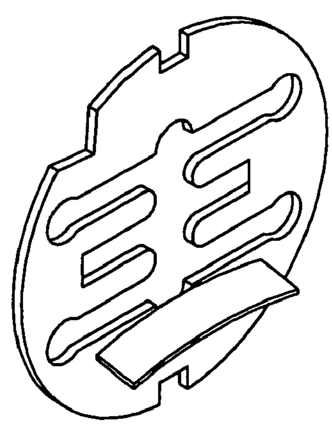
FIG. 7 is a perspective view showing a one-piece axial and radial preload spring.

FIG. 7 illustrates a one-piece axial and radial preload spring 36 which may find use particularly with the upper bearing unit 18 and which will of course simplify assembly and thus reduce costs.

The invention claimed is:

1. A bearing assembly comprising a housing defining a generally cylindrical bearing chamber which is open axially at least at one end, spaced axially aligned first and second bearing means at least one of which is a ball bearing unit disposed in said bearing chamber, said ball bearing unit comprising an annular series of ball bearings and associated inner and outer bearing rings, an axial thrust reaction surface adjacent and adapted to be engaged by one of said bearing means, a shaft journaled in said first and second bearing means with a portion thereof projecting through said open end of said cylindrical chamber and carrying a load having an axial component in a direction opposing the thrust reaction surface, said shaft and at least the bearing means engaging the axial thrust reaction surface being secured against relative axial movement tending to move the bearing means in a direction away from the thrust reaction surface whereby the axial load urges the bearing means into firm engagement with said axial thrust reaction surface, an axial preload means also urging said one bearing means into engagement with said axial thrust reaction surface, resilient means disposed radially adjacent and in engagement with at least one of said bearing means and applying a radial preload thereto, and a pair of circumaxially spaced radial reaction means engaging said bearing means and opposing said radial preload means.

2. A bearing assembly as set forth in claim 1 wherein said axial thrust reaction surface has a frusto-conical configuration and serves not only to react axial forces but also centers the bearing means engaging the same.

3. A bearing assembly as set forth in claim 1 wherein both of said bearing means are ball bearing units, and wherein both bearing units are located in the bearing chamber in axially spaced relationship.

4. A bearing assembly as set forth in claim 3 wherein both bearing units are in press-fit engagement with the shaft.

5. A bearing assembly as set forth in claim 3 wherein both bearing units are provided with radial preload means in the form of cooperating spring means and a pair of opposing circumaxially spaced reaction surfaces.

6. A bearing assembly as set forth in claim 4 wherein said reaction means take the form of abutments which project radially inwardly from the wall of the bearing chamber on a side thereof generally opposite the radial preload springs.

7. A bearing assembly as set forth in claim 3 wherein both the inner and outer rings of the bearing unit engaging the axial thrust reaction surface are smaller in diameter than the corresponding rings of the other bearing unit, and wherein the bearing chamber is tapered so as to decrease in diameter in progression from said other bearing unit toward the first mentioned.

8. A bearing assembly as set forth in claim 3 wherein at least the inner ring of the bearing unit engaging the axial thrust reaction surface is of a smaller diameter than that of the inner ring of said other bearing. bearing unit.

9. A bearing assembly as set forth in claim 3 wherein the outer rings of the two bearing units are substantially equal in diameter, and wherein the bearing chamber is cylindrical.

10. A bearing assembly as set forth in claim 1 wherein at least the bearing means engaging the axial thrust reaction surface is in press-fit engagement on the shaft.

11. A bearing assembly as set forth in claim 1 wherein an annular shoulder is provided substantially around the shaft adjacent the bearing means engaging the axial thrust reaction surface, the shoulder residing on the side of the bearing means opposite the axial thrust reaction surface.

12. A bearing assembly as set forth in claim 1 wherein the wall of said bearing chamber adjacent the bearing engaging the axial trust reaction surface is provided with at least three axially elongated centering ribs spaced circumaxially so as to be engaged and crushed by the outer ring of the bearing whereby to center the bearing radially.

13. A bearing assembly as set forth in claim 1 wherein the bearing housing is of molded plastic construction.

14. A bearing assembly as set forth in claim 13 wherein the bearing housing is of molded plastic construction with the centering ribs and axial thrust reaction surface molded integrally with and as part of the housing.

15. A bearing assembly as set forth in claim 13 wherein the projecting portion of the shaft drives an air moving impeller also of molded plastic construction.

* * * * *